(12) United States Patent
Kurth et al.

(10) Patent No.: US 9,010,196 B2
(45) Date of Patent: Apr. 21, 2015

(54) FLOW-RATE MEASUREMENT SYSTEM

(71) Applicant: Krohne AG, Basel (CH)

(72) Inventors: Martin Kurth, Neunkirchen (DE); Jan Drenthen, Oosterhout (NL); Marcel Verneulen, Zevenbergen (NL)

(73) Assignee: Krohne AG, Basel (CH)

( * ) Notice: Subject to any disclaimer, the term of this patent is extended or adjusted under 35 U.S.C. 154(b) by 364 days.

(21) Appl. No.: 13/659,325

(22) Filed: Oct. 24, 2012

(65) Prior Publication Data

US 2013/0340519 A1    Dec. 26, 2013

(51) Int. Cl.
| | |
|---|---|
| G01F 1/00 | (2006.01) |
| G01F 1/712 | (2006.01) |
| G01F 7/00 | (2006.01) |
| G01F 25/00 | (2006.01) |
| G01F 1/66 | (2006.01) |

(52) U.S. Cl.
CPC .............. *G01F 7/00* (2013.01); *G01F 25/0007* (2013.01); *G01F 25/003* (2013.01); *G01F 1/667* (2013.01)

(58) Field of Classification Search
None
See application file for complete search history.

(56) References Cited

U.S. PATENT DOCUMENTS

| | | | |
|---|---|---|---|
| 4,090,179 A | 5/1978 | Hirano | |
| 4,672,997 A | 6/1987 | Landis et al. | |
| 6,895,813 B2 | 5/2005 | Mattar | |
| 6,993,252 B1 * | 1/2006 | Dasgupta et al. | ............. 392/385 |
| 7,628,080 B1 | 12/2009 | Feller | |
| 7,752,919 B2 | 7/2010 | Straub, Jr. et al. | |
| 2010/0005900 A1 | 1/2010 | Straub, Jr. et al. | |
| 2010/0223976 A1 | 9/2010 | Jakubenas | |
| 2012/0216600 A1 | 8/2012 | Heyne et al. | |
| 2013/0340519 A1 * | 12/2013 | Kurth et al. | ..................... 73/196 |

FOREIGN PATENT DOCUMENTS

| | | |
|---|---|---|
| DE | 196 48 784 C2 | 4/1998 |
| DE | 196 47 350 A1 | 5/1998 |
| DE | 103 12 304 B3 | 3/2004 |
| EP | 0 465 182 A2 | 1/1992 |

* cited by examiner

*Primary Examiner* — Andre Allen
(74) *Attorney, Agent, or Firm* — Roberts Mlotkowski Safran & Cole, P.C.; David S. Safran

(57) ABSTRACT

A system for measuring flow rate with at least a first and a second flow meter provides a flow-rate measurement system which easily allows self-monitoring. This result is achieved by the system in that the first flow meter and the second flow meter differ from one another and/or have different orientations for the flow rate measurement, and each have an evaluation unit which produces data from the flow rate measurement. Furthermore, there is a monitoring device which is connected to the evaluation units such that the monitoring device acquires data produced by the evaluation units, and which is made such that it produces at least one comparison result from a comparison of the data produced by the evaluation units and signals at least the occurrence of a fault state which is associated with at least one comparison result.

11 Claims, 1 Drawing Sheet

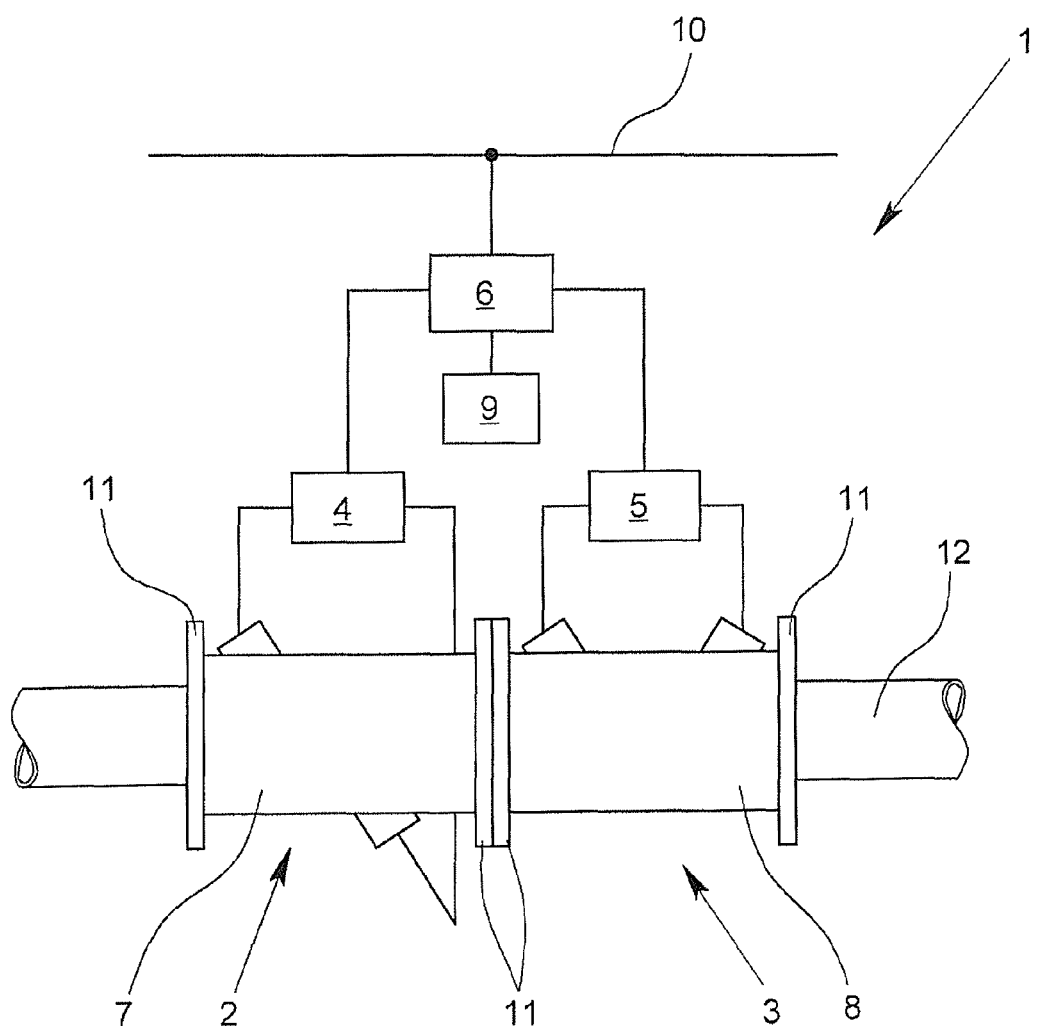

FLOW-RATE MEASUREMENT SYSTEM

BACKGROUND OF THE INVENTION

1. Field of the Invention

The invention relates to a system for measuring flow rate with at least one first flow meter and one second flow meter.

2. Description of Related Art

Aside from the fact that high measurement accuracy in any flow rate measurement is always desirable from a technical standpoint, for high-value liquid or gaseous products, such as, for example, petroleum and natural gas, there is considerable interest in the fact that, from the standpoint of the supplier, the amount and only the amount which is to be delivered is delivered, and from the standpoint of the consumer, that the required amount and at least the required amount is obtained. Measurement tolerances are always a burden to one of the parties involved, usually to the burden of the supplier.

Known measurement methods for determining the flow rate use, for example, the transit time of ultrasonic waves, the time being transmitted either directly between the two ultrasonic transducers or undergoing a reflection on the wall of the measurement tube (see, for example, German Patents DE 196 48 784 C2 and DE 103 12 034 B3). For this application, especially flow meters with a measurement accuracy as high as possible are preferred. Ultrasonic measurement methods can be used advantageous especially for large pipe widths since, with the ultrasonic waves in a suitable arrangement of the ultrasonic transmitters and receivers, the flow-traversed pipe cross section can be essentially completely monitored; this applies mainly to those measurement devices which implement a plurality of measurement paths which traverse the flow cross section in different regions.

Based on the changing measurement conditions or ageing phenomena of the measurement devices, however, measurement uncertainties or even measurement errors can arise. In order to identify these phenomena, the prior art discloses placing different flow meters in succession, the measurement devices differing from one another in measurement principle or by the manufacturer. This is associated with the expectation that the measurement devices, for example, show different ageing behavior and react differently to changes of measurement conditions (for example, dirt or deposits). To the extent this is given and if deviations of measurement data are observed and recognized, this diversity of the measurement of the flow rate is used for monitoring of the system.

The disadvantage in these systems is that the diversity must be combined again; this can be associated with difficulties. If different measurement principles are used, the values cannot be compared directly to one another or different error tolerances must be observed. Moreover, if measurement devices of different manufacturers are used, optionally, additional information about the respective particulars must be present. Therefore, it would be advantageous to have a simplified system so that computational effort can be concentrated on the actual evaluation and not for comparing of the data from multiple devices.

The initially described applications of flow rate measurement are often the so-called standardization-mandated trade in which special demands are imposed on the accuracy of the measurement devices and mainly on the demonstration of this accuracy. For the demonstration of the accuracy, it is generally necessary to remove the system—therefore, the measurement devices with their respective measurement tubes and optionally also connecting tubes between them—from the surrounding pipe system at regular intervals and to subject them to calibration, here conformity with certain accuracy requirements being confirmed by institutes authorized to do this, such as, for example, the Federal Physical-Chemical Institute in Germany. This process is very complex since these systems can be heavy and since provisions must be made for the required bypasses. Therefore, it would be advantageous to use systems which have calibration intervals as long as possible, ideally, after a first calibration, have an "infinite" calibration term.

SUMMARY OF THE INVENTION

Accordingly, a primary object of the invention is to provide a flow-rate measurement system which easily allows self-monitoring.

This object is achieved in accordance with the invention, first of all, essentially in the flow-rate measurement system under consideration, in that the first flow meter and the second flow meter differ from one another and/or have different orientations for the flow-rate measurement, and that the first flow meter and the second flow meter each have an evaluation unit which produces data from the flow-rate measurement. Moreover, there is a monitoring device which is connected to the evaluation units such that the monitoring device acquires data which have been produced by the evaluation units. Furthermore, the monitoring device is made such that the monitoring device produces at least one comparison result proceeding from a comparison of the data produced by the evaluation units and signals at least the occurrence of a fault state which is associated with at least one comparison result.

The system in accordance with the invention has two flow meters which differ from one another. The differences can lie in the manufacturer, in the measurement principle which is used for the flow rate measurement and in the manner of use or implementation of the measurement principle. The difference is especially such that the errors of measurement or changes of the measurement set-up, for example, dirt, act differently for the individual flow meters or can be derived differently from the measurement data which have been obtained.

Alternatively or in addition, the first and the second flow meters have different orientations for the respective flow rate measurement. The orientation relates to the arrangement of the respective components of the two flow meters, which components are relevant to flow rate measurement, at least in one plane which is perpendicular to the flow direction of the measurement medium. If, in one configuration, the two flow meters are arranged in succession along the flow direction, they also have different orientations with respect to the measurements. The orientation results especially from the arrangement of the relevant components or from the interaction which is relevant to the measurement with the measurement tube through which the measurement medium flows. The orientations differ preferably in that perturbations (for example, deposits or adhesions) act very differently on the respective flow rate measurements. For example, if an orientation runs such that an interaction takes place with the part of the measurement tube which is located below in the direction of the force of gravity and the other orientation runs essentially perpendicular to it, for example, at half the height of the measurement tube, sediment acts differently on the measurements of the two flow meters. The two orientations can be located at the same or different axial position along the flow of the measurement medium. Altogether, in other words: the flow meters react to perturbations—in whatever—differently. This varied behavior is used such that the monitoring device compares the evaluation data of the evaluation units assigned to the flow meters and generates a corresponding comparison result. For this reason, the monitoring device has a corresponding logic or a neural network which, in one configuration, also allows at least one training phase.

The evaluation of data produced by two evaluation units can, on the one hand, increase the amount of information about the measurement conditions, since data are generated by two measurement devices. On the other hand, for example, plausibility considerations make it possible to monitor the state of one measurement device by the other. In this way, very advantageous self-monitoring arises. In the implementation, for example, overly great differences between the measurement values for the flow rate are signaled. Alternatively or in addition, differences between secondary data obtained in addition from the measurements, for example, about deposits on the pipe wall or on an element of a measurement device or about the temperature of the measurement medium, are displayed as errors. For this purpose, it is provided, in one configuration, that at least one evaluation unit produces secondary data from a measurement of the flow rate in addition to a value of the flow rate. These secondary data, in addition to the aforementioned, for example, are statements about the form of the flow of the medium, about the presence of different phases, etc. Secondary data are also, for example, interim results on the path of the evaluation, for example, the transit time of a measurement signal, to the value for the flow rate of the measurement medium.

This is associated with another configuration in which the two evaluation units produce secondary data from a measurement of the flow rate in addition to a value of the flow rate. Here, the monitoring device compares at least the secondary data to one another. Preferably, the actual measurement data about the flow rate are likewise used for the comparison. The flow meters used for the system in accordance with the invention have special evaluation units which include monitoring and control functions and which therefore provide information about the measurement accuracy and about quantities which influence the measurement. For the output of these secondary data, the flow meters or especially the evaluation units, generally, have a so-called service interface which is provided in addition to the normal interface for the measurement data. The measurement medium is a liquid, a flowable mixture or especially a gas or a gas mixture.

In one configuration, the monitoring device compares the data which have been generated by the evaluation units from the same measurement instants and/or from different measurement instants relative to one another. Data from preceding measurements, therefore, so-called historical data, allow the recognition of tendencies and developments as arise, for example, by deposits or wear. If developments are especially so clear that they allow an extrapolation, errors can be signaled before they have an effect in incorrect measurement values for the flow rate. For the evaluation of the data of preceding measurements, in one configuration, there is at least one storage unit for storage of data. In one configuration, the storage unit is especially connected to the evaluation unit.

In one configuration, the monitoring device stores data which have been generated by the evaluation unit, at an initialization instant and at at least one especially known value of the flow rate, as reference data. The initialization instant is, for example, the start-up of the system. For this instant, the data which are generated by the evaluation units and which arise from the respective measurements with the assigned flow meters, are stored as reference data. Preferably, the data are determined at the previously known speeds of the measurement medium or at previously known flow rates. In one configuration, the data are stored for six different flow rates. Six speeds are checked, for example, during a so-called high pressure calibration so that the data which have been generated here can be suitably used. The stored data yields a type of fingerprint of the system during the initialization instant or reference instant.

During current operation, at least the data generated by the evaluation units at the comparison instant are compared to the reference data by the monitoring device at a definable comparison instant. This, in turn, preferably, is compared relative to the different speeds of the measurement medium. Possibly, if there are no data for all speeds for which the reference data have been stored, the existing data are optionally interpolated or extrapolated. The current data for the comparison also optionally originate from preceding measurements with these speeds, if there are no instantaneously available data for all speeds. In the comparison performed for operator control of the system, the data between the flow meters are compared and also with reference data. Thus, self-monitoring of the system arises over the time development by, so to speak, a theoretical fingerprint being compared to a current actual fingerprint, preferably depending on the different speeds or flow rate values.

The following configurations relate especially to the flow meters.

In one configuration, it is provided that the first flow meter and the second flow meter differ from one another with respect to the type of flow rate measurement. A configuration which calls for the two flow meters to originate from the same manufacturer is especially linked to the former configuration. Types of flow rate measurement are that, for example, measure via ultrasonic signals, measure the coriolis force or use thermal methods. In one configuration, at least one flow meter allows a measurement of the flow rate in the two flow directions through the pertinent measurement tube.

Furthermore, the type of flow rate measurement can also differ from one another in the specific implementation of the same measurement principle. Therefore, one configuration calls for the first flow meter and the second flow meter to each be an ultrasonic flow meter with one measurement tube, the first flow meter and the second flow meter differing from one another at least with respect to the path of the ultrasonic signals in the respective measurement tube. Thus, in one flow meter, the ultrasonic transducers are located opposite one another at different locations of the measurement tube so that they convert the ultrasonic signals directly from ultrasonic transducer to ultrasonic transducer. For the other flow meter, the ultrasonic transducers are on the same side of the measurement tube and the ultrasonic signals, after emission, undergo a reflection on the wall of the measurement tube and are then detected only by the other ultrasonic transducer. The path of the ultrasonic signals which differs in terms of length also yields a different evaluation or a different dependency on the measurement conditions. This in turn has the advantage that errors or perturbations do not act in the same way in the two flow meters, but remain detectable by their difference.

If the two flow meters work using ultrasonic signals, in another configuration, the two measurement devices are identical and differ in the system only with respect to the orientation of the measurement path which the ultrasonic signals traverse for the respective measurements. The pairs of transmitters and receivers of the two measurement devices necessary for this purpose, in one version, are turned relative one another with respect to the periphery of the measurement tubes.

It is important in the result that, in a choice and/or orientation of the first and of the second flow meter, especially for a demonstration of accuracy, it is ensured that relevant influences/perturbations act differently on the first and the second flow meters. When this is demonstrated, flow-rate measurement systems which have a very long and essentially also infinite calibration term can be implemented.

In one exemplary embodiment of the invention, at least one flow meter is made such that, for the flow rate measurement, at least two, especially six, different measurement paths, therefore especially propagation paths for the ultrasonic signals, are used which differ from one another with respect to the arrangement and/or orientation in the measurement tube.

In one advantageous configuration, it is provided that one measurement tube of the first flow meter and one measurement tube of the second flow meter are located directly next to one another and are connected to one another. This yields a very short construction of the system. Conventionally, between different measurement devices, space is left in the form of a normal pipe section. In this configuration, however, the flow meters are located directly flange on flange and are connected to one another.

In one configuration, it is provided that the monitoring device is a component of the first flow meter or of the second flow meter. In this configuration, the two flow meters communicate directly with one another and one measurement device transfers its data to the other measurement device which has the monitoring device.

In particular, there are a plurality of possibilities for configuring and developing the measurement device in accordance with the invention. In this respect, reference is made to the following description of exemplary embodiments in conjunction with the accompanying drawings.

BRIEF DESCRIPTION OF THE DRAWINGS

The sole FIGURE schematically shows a system for flow rate measurement which illustrates essentially the active functional relationships.

DETAILED DESCRIPTION OF THE INVENTION

The FIGURE shows purely schematically a system 1 for measuring the flow rate of a measurement medium, which is especially a gas or gas mixture, but could be a liquid or a particulate solid. For this purpose, there are two flow meters 2, 3 which are made as ultrasonic flow meters. The first flow meter 2 and the second flow meter 3 differ in the arrangement of the ultrasonic transducers, and thus, by the path taken by the ultrasonic signals for the measurement. On the one hand, with reflection on the wall of the respective measurement tube, and on the other hand, without reflection on the wall of the respective measurement tube. The measurement signals are evaluated in the evaluation units 4, 5 which generate not only a value for the flow rate, but also secondary data about the measurement or about the flow rate, and which transfer these secondary data to the monitoring device 6. These secondary data are, for example, uncertainties of the measurement value of the flow rate, noise signals or intermediate quantities which arise out of the measured signals and which are relevant to the determination of the flow rate and act on the measured quantity—here, the transit time of the ultrasonic signals.

The monitoring unit 6 compares the data of the two evaluation units 4, 5 and generates comparison results from them. Depending on the respective comparison result, optionally, an error signal is produced. For example, if a measurement with the first flow meter 2 yields a fouling of the measurement tube 7 of the first flow meter 2, this is not indicated by the measurement with the second flow meter 3, i.e., if the data of the evaluation unit 5 of the second flow meter 3 indicate that the measurement tube 8 of the second flow meter 3 is not fouled, this can be evaluated such that there is increased uncertainty with respect to the measurement values or that a measurement is accordingly uncertain. For these comparisons, the monitoring device 6 has especially a neural network or is designed for the use of fuzzy logic. Furthermore, types of unallowable comparison results which are associated with an error state are filed.

In order to be able to derive developments, especially from preceding measurements, or to be able to recognize unallowable sudden changes of the measured values, the monitoring device 6 is connected to a storage unit 9 in which these older values of the flow rate or older secondary data can be filed.

If the measured values of the two evaluation units 4, 5 are identical for the flow rate within a definable tolerance range, the monitoring unit 6, in one version, for the output of the, for example, average flow rate value, determines the measurement accuracy based on the plurality of the different secondary data.

Furthermore, in the illustrated configuration the monitoring unit 6 also has a corresponding interface for linkage to a field bus 10, with which, especially a measurement value for the flow rate, optionally, also the error signals, are transmitted.

The flow meters 2, 3 themselves especially have a logic which is used to monitor the measurement values and measurement conditions. Because the two work differently, the required diversity arises which is used, in turn, in the monitoring device 6 for monitoring. The system 1 thus monitors itself and by the choice of the flow meters 2, 3 especially errors have different effects and can therefore be recognized.

If, like here, the two flow meters 2, 3 originate from the same manufacturer, the two can also be made such that they do not mutually influence one another during measurement or do influence one another at least to known degrees. Therefore, the two measurement devices 2, 3 are inserted directly next to one another, therefore flange 11 to flange 11, into the pipe system 12 through which the measurement medium flows.

If the type of interaction is known in measurement devices of different manufacturers or in measurement devices of different type, and this can be suitable considered by the monitoring device 6 for use of the data of the evaluation units 4, 5, they are also located directly next to one another in one alternative version (not shown) in order to have only a small installation space requirement.

What is claimed is:

1. A system for measuring flow rate, comprising:
at least one first flow meter,
at least one second flow meter, and
a monitoring device
wherein the first flow meter and the second flow meter differ from one another in at least one of type of flow rate measurement, manufacturer and flow rate measurement orientation,
wherein the first flow meter and the second flow meter each have an evaluation unit which produces data from a flow rate measurement,
wherein the monitoring device is connected to the evaluation units such that the monitoring device acquires data produced by the evaluation units, and
wherein the monitoring device is adapted to produce at least one comparison result from a comparison of the data produced by the evaluation units and for signaling at least the occurrence of a fault state which is associated with at least one comparison result.

2. The system in accordance with claim 1, wherein at least one of the evaluation units produces secondary data from measurement of the flow rate in addition to a value of the flow rate.

3. The system in accordance with claim 2, wherein the evaluation units is adapted to produce secondary data from a measurement of the flow rate in addition to a value of the flow rate, and wherein the monitoring device compares at least the secondary data from the evaluation units relative to one another.

4. The system in accordance with claim 1, wherein the monitoring device is adapted to compare the data generated by the evaluation units from the same time of measurement relative to one another.

5. The system in accordance with claim 1, wherein the monitoring device is adapted to compare the data generated by the evaluation units from different times of measurement relative to one another.

6. The system in accordance with claim 5, wherein there is at least one storage unit for storage of data.

7. The system in accordance with claim 6, wherein the monitoring device is adapted to store data generated by the evaluation units at an initialization instant and at at least one known value of the flow rate as reference data, and wherein the monitoring device is adapted for comparing data generated by the evaluation units relative to the reference data at least at one definable comparison instant.

8. The system in accordance with claim 1, wherein the first flow meter and the second flow meter differ from one another with respect to the type of flow rate measurement.

9. The system in accordance with claim 8, wherein the first flow meter and the second flow meter are each an ultrasonic flow meter with a measurement tube, the first flow meter and the second flow meter differing from one another at least with respect to the path of ultrasonic signals produce in the respective measurement tube.

10. The system in accordance with claim 1, wherein a measurement tube of the first flow meter and a measurement tube of the second flow meter are located directly next to one another and are connected to one another.

11. The system in accordance with claim 1, wherein the monitoring device is a component of one of the first flow meter and the second flow meter.

* * * * *